United States Patent  
Wozniak et al.

(10) Patent No.: US 12,079,707 B2
(45) Date of Patent: Sep. 3, 2024

(54) NEURAL APPARATUS FOR A NEURAL NETWORK SYSTEM

(71) Applicant: International Business Machines Corporation, Armonk, NY (US)

(72) Inventors: Stanislaw Andrzej Wozniak, Kilchberg ZH (CH); Ljubica Cimesa, Paris (FR); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 17/076,458

(22) Filed: Oct. 21, 2020

(65) Prior Publication Data

US 2022/0121910 A1  Apr. 21, 2022

(51) Int. Cl.
*G06N 3/048* (2023.01)
*G06N 3/049* (2023.01)
*G06N 3/063* (2023.01)
*G06N 3/084* (2023.01)

(52) U.S. Cl.
CPC ............ *G06N 3/048* (2023.01); *G06N 3/049* (2013.01); *G06N 3/063* (2013.01); *G06N 3/084* (2013.01)

(58) Field of Classification Search
CPC ........ G06N 3/048; G06N 3/049; G06N 3/063; G06N 3/084; G06N 3/044; G06N 3/045; G06N 3/065
See application file for complete search history.

(56) References Cited

U.S. PATENT DOCUMENTS

| 2009/0235809 A1* | 9/2009 | Stanley ................. G10H 1/0025 84/611 |
| 2012/0173471 A1 | 7/2012 | Ananthanarayanan |
| 2013/0204814 A1 | 8/2013 | Hunzinger et al. |
| 2015/0269482 A1* | 9/2015 | Annapureddy ......... G06N 3/049 706/25 |
| 2016/0275395 A1* | 9/2016 | Amir ......................... G06N 3/08 |
| 2018/0082170 A1 | 3/2018 | Modha |
| 2018/0174039 A1* | 6/2018 | Davies ...................... G06N 3/08 |
| 2018/0174041 A1* | 6/2018 | Imam ..................... G06N 3/063 |
| 2018/0225570 A1 | 8/2018 | Eliasmith |

(Continued)

FOREIGN PATENT DOCUMENTS

WO   2015148217 A1   10/2015

OTHER PUBLICATIONS

Amin, H.H., & Fujii, R.H. (2004). Spike train decoding scheme for a spiking neural network. 2004 IEEE International Joint Conference on Neural Networks (IEEE Cat. No.04CH37541), 1, 477-482. (Year: 2004).*

(Continued)

*Primary Examiner* — KC Chen
(74) *Attorney, Agent, or Firm* — Peter J. Edwards

(57) ABSTRACT

A neural apparatus for a neural network system may be configured to receive one or more input signals during a decode time period, decode the one or more input signals during the decode time period, resulting in a decoded signal, and upon termination of the decode time period, process the decoded signal using internal neuron dynamics. The processed signal may be used to encode and emit one or more output signals in a subsequent decode time period to another neural apparatus of the neural network system.

15 Claims, 5 Drawing Sheets

(56) References Cited

U.S. PATENT DOCUMENTS

2019/0057301 A1 2/2019 Pantazi
2020/0316773 A1 10/2020 Izhikevich

OTHER PUBLICATIONS

PCT/IB2021/058535, International Search Report and Written Opinion, mailed Jan. 26, 2022.
Kuzum et al., "Synaptic electronics: materials, devices and applications", Nanotechnology, vol. 24, 23 pages, 2013.
Modha et al., "Cognitive Computing", Communications of the ACM, vol. 54, No. 8, 2011.
Kim S. et al., "Analog CMOS-based Resistive Processing Unit for Deep Neural Network Training", MWSCAS 2017, pp. 422-425.
Le Gallo M. et al., "Mixed-precision in-memory computing", Nature Electronics, vol. 1, No. 4, pp. 246-253, Apr. 2018.
Woźniak, S. et.al., "Learning Spatio-Temporal Patterns in the Presence of Input Noise using Phase-Change Memristors", 4 pages, ISCAS 2016.
Pantazi A. ,et. al., "All-memristive neuromorphic computing with level-tuned neurons", Nanotechnology 27, 14 pages, 2016.
Sidler S., et al., "Unsupervised Learning Using Phase-Change Synapses and Complementary Patterns", ICANN 2017, pp. 281-288.
Diehl, P. U. et al, "Conversion of Artificial Recurrent Neural Networks to Spiking Neural Networks for Low-power Neuromorphic Hardware", ICRC 2016, pp. 1-8.
C. Zhao, et al., Interspike-Interval-Based Analog Spike-Time-Dependent Encoder for Neuromorphic Processors, IEEE Tran. on VLSI Systems, vol. 25, No. 8, 2017.
H. Mostafa, B. U. Pedroni, S. Sheik and G. Cauwenberghs, "Fast classification using sparsely active spiking networks," 2017 IEEE International Symposium on Circuits and Systems (ISCAS), Baltimore, MD, 2017, pp. 1-4, doi: 10.1109/ISCAS.2017.8050527.
B. Rueckauerand S.-C. Liu, "Conversion of analog to spiking neural networks using sparse temporal coding," in 2018 ISCAS, Florence, Italy, 2018.
S. Woźniak and A. Pantazi, "Neuromorphic Spike Integrator Apparatus", U.S. Appl. No. 16/565,852, Sep. 2019.
S. Woźniak, A. Pantazi, T. Bohnstingl, and E. Eleftheriou, "Deep learning incorporating biologically-inspired neural dynamics," arXiv:1812.07040 [cs], pp. 1-12, Dec. 2018.
Moraitis, T. et al., Spiking Neural Networks Enable Two-Dimensional Neurons and Unsupervised Multi-Timescale LearningPublished Date: Jul. 13, 2018.
Liu et al., PT-Spike: A Precise-Time-Dependent Single Spike Neuromorphic Architecture with Efficient Supervised LearningPublished Date:Jan. 25, 2018.
Bagheri et al., Adversarial Training for Probabilistic Spiking Neural NetworksPublished Date:Jun. 28, 2018.
Tapson et al., Synthesis of neural networks for spatio-temporal spike pattern recognition and processingPublished Date: Aug. 30, 2013.
Almomani_etal., A comparative study on spiking neural network encoding schema: implemented with cloud computingPublished Date: Dec. 19, 2018.

\* cited by examiner

NEURAL APPARATUS FOR A NEURAL NETWORK SYSTEM

BACKGROUND

The present disclosure relates to the field of computer systems, and more specifically, to a neural apparatus for a neural network system.

Neural networks are a computational model used in artificial intelligence systems. Neural networks may be based on multiple artificial neurons. Each artificial neuron may be connected with one or more other artificial neurons, and these connections ("links") may enhance or inhibit the activation state of adjoining neurons. Artificial neurons in spiking neural networks (SNNs) may be provided with a firing threshold that must be exceeded by a membrane potential of the neurons in order to generate a spike. This thresholding may be a component of an artificial spiking neuron that enables an energy efficient sparse communication with spikes.

SUMMARY

Various embodiments provide a neural apparatus for a neural network system, method and computer program product, as described by the independent claims.

Advantageous embodiments are described in the dependent claims. Embodiments of the present disclosure may be freely combined with each other if they are not mutually exclusive.

In one aspect, some embodiments of the disclosure relate to a neural apparatus ("sending apparatus") for a neural network system. The neural apparatus may be configured to receive one or more input signals during a decode time period and decode the one or more input signals during the decode time period, resulting in a decoded signal, upon termination of the decode time period, process the decoded signal using a model indicative of internal neural dynamics, and use the processed signal to encode and emit one or more output signals in a subsequent decode time period to another neural apparatus ("receiving apparatus") of the neural network system.

In another aspect, some embodiments of the disclosure relate to a method for a neural apparatus. The method may comprise receiving one or more input signals during a decode time period, decoding the one or more input signals during the decode time period, resulting in a decoded signal, upon termination of the decode time period, processing the decoded signal using a model indicative internal neural dynamics, and using the processed signal to encode and emit one or more output signals in a subsequent decode time period to another neural apparatus of the neural network system.

In another aspect, some embodiments of the disclosure relate to an artificial neural network system comprising multiple layers, wherein at least one layer of the multiple layers may comprise one or more neuron realizations that include the neuron apparatus according to preceding embodiments. For example, each neuron of the artificial neural network system may be the neuron apparatus according to preceding embodiments.

In another aspect, some embodiments of the disclosure relate to a computer program product comprising a computer-readable storage medium having computer-readable program code embodied therewith. The computer-readable program code may be configured to implement the method according to preceding embodiments.

BRIEF DESCRIPTION OF THE DRAWINGS

In the following, embodiments of the disclosure are explained in greater detail, by way of example only, making reference to the drawings in which.

DETAILED DESCRIPTION

Figure 1:
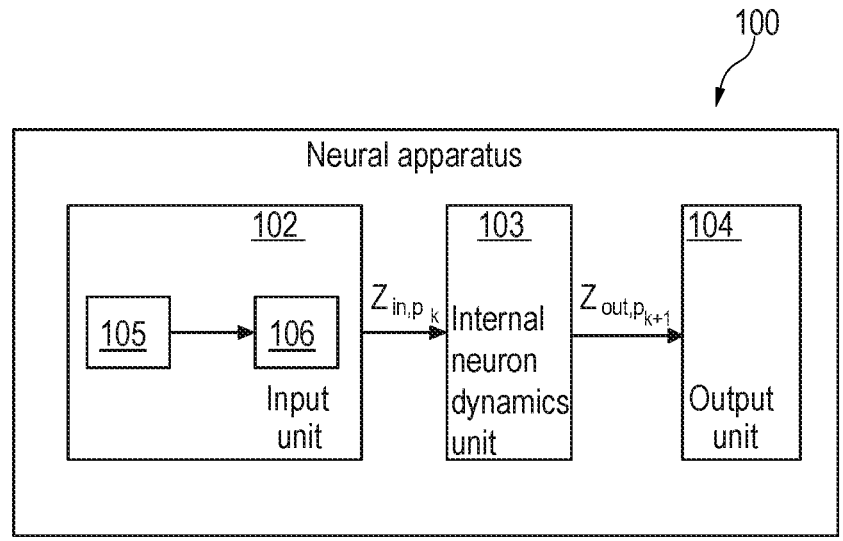
FIG. 1 illustrates an example of a neuron apparatus consistent with some embodiments of the disclosure.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to help explain the principles of the embodiments, the practical application or technical improvement over technologies found in the marketplace, or to enable others of ordinary skill in the art to understand the embodiments disclosed herein.

The neural apparatus in some embodiments may provide a multi timescale spiking neuron in which different parts of the neuron operate at different timescales. Some embodiments may enhance the operation of neuromorphic spike based apparatuses by efficiently controlling the spiking capabilities of neuromorphic spike based apparatuses. In particular, some embodiments may make use of input timing information, which may have theoretically appealing capabilities to more efficiently transmit the information. This may improve accuracy in comparison to standard spiking neurons and improve efficiency in comparison to state of the art rate coding. Furthermore, this may enable an end to end trainable SNN with a backpropagation through time (BPTT) technique without the need for approximations. In this way, some embodiments may improve the spiking processes of artificial spiking neurons to enhance sending and receiving rich and accurate information.

The processing of the decoded signal using the model may, for example, enable image processing e.g., for handwritten digit recognition. The model $f$ indicative of (or representative of) the internal neuron dynamics may be a model of the internal neuron dynamics of the neural apparatus. The model may, for example, be a model of somatic computation. The model may, for example, be a stateful model. The model may, for example, use one or more activation functions and an internal state e.g., representing a membrane potential of the neural apparatus. In one example, the model may be an activation function or a combination of multiple activation functions.

The neural network system may be configured to implement/execute an artificial neural network, such as a SNN. In one example, the neural apparatus may be implemented as a neuron of the artificial neural network. For example, the artificial neural network may comprise multiple layers, wherein each layer of the multiple layers comprises neurons, and wherein each neuron of the neurons may be the neural apparatus.

According to some embodiments, each signal of the input and output signals may encode information in an arrival time of the signal at the respective apparatus. Each signal of the input signals and output signals may be a spike. The spike may have, for example, a value of zero or one. Each signal of the input signals may encode information in arrival time of the signal at the sending apparatus. The input signals may be received, for example, from one or more feed-forward connections to the neural apparatus and/or from one or more recurrent connections to the neural apparatus. The neural apparatus may be connected to other neural apparatuses of the neural network system via feed-forward connections and/or recurrent connections. Each signal of the output signals may encode information in arrival time of the signal at the receiving apparatus. A received signal may be a variable value such as a zero-one normalized real value. For example, the value may be indicative of a content of a pixel of an image.

According to some embodiments, the apparatus may be configured to decode the input signals by: a) upon receiving an input signal of the input signals, determining for the input signal a modulating value corresponding to the arrival time of the input signal, b) weighting the received signal with the determined modulating value, c) integrating the weighted signal into a current value of an input state of the apparatus, and repeating operations a) to c) for each received input signal during the decode time period, wherein the decoded signal may be the integrated value. The input state may, for example, be (re)initialized for each decode time period to a given value e.g., zero.

For example, each input signal of the input signals received in operation a) may be a signal that may be weighted by a synaptic weight associated with the signal. For example, a signal may pass through a synapse unit with a synaptic weight w and the signal may be weighted by the synaptic weight w, resulting in the input signal received in operation a).

According to some embodiments, the apparatus may be configured for determining the modulating value as a value of an input function at the arrival time, wherein the input function is a time dependent piecewise linear function. These embodiments may enhance the capabilities of the input unit in distinguishing signal sequences. For example, if a same set of signals is received multiple times, wherein in each time the signals are received with a different order, that is at different times, this may result in different decoded signal.

According to some embodiments, the input function may have values decreasing with increasing arrival time values.

According to some embodiments, the apparatus may be further configured for determining the modulating value as a value of an input function at the arrival time, wherein the input function is a time dependent non-linear function involving a predefined range of values. This embodiment may be advantageous as, in comparison to a piecewise linear function defined for a given decode time period, the range of values may be increased and the resolution may be maintained through emission of further pulses with increasingly fine-grain contributions.

According to some embodiments, the apparatus may be configured to encode and emit one or more output signals using an output function. The output function may be configured to provide a value for each point of time in the subsequent decode time period. The apparatus may further be configured for: determining one or more values of the output function such that a combination (e.g., sum) of the determined values represents a value of the processed signal, and providing the one or more output signals at the points of time corresponding to the determined values.

According to some embodiments, the output function may be a time dependent piecewise linear function or time dependent non-linear function.

According to some embodiments, the output function may be a linear, exponential or staircase function.

According to some embodiments, the apparatus may comprise an input unit, internal neuron dynamics unit, and output unit. The input unit may be configured to perform the receiving and decoding of the one or more input signals. The internal neuron dynamics unit may be configured to perform the processing of the decoded signal, and the output unit may be configured to perform the encoding and emitting one or more output signals. The internal neuron dynamics unit may be configured to implement the model indicative of the internal dynamics.

Each of the input unit, the internal neuron dynamics unit, and the output unit may use its own kernel or dynamics in order to perform its respective operation. The input unit may be referred to as a dendritic unit that has a dendritic kernel. The output unit may be referred to as an axonal unit that has an axonal kernel. The internal neuron dynamics unit may process the decoded signal (e.g., for each consecutive processing operation) in accordance with the model of the internal neural dynamics Not limiting the scope of the internal neural dynamics, further descriptions utilize, as an illustrative example of the model, a function that may be non-linear, time varying, and involve an internal state. The present disclosure may balance the fast operating feature of the dendritic and axonal kernels and the slow operating feature of the internal neural dynamics. The fast operating dendritic and axonal kernels may enable to transmit information using timing. Slow operating internal neural dynamics may make use of the more accurate input and output values. The function of the model $f$ may be a differentiable function. The differentiable function may enable an end to end training with BPTT.

Some embodiments may be advantageous as they may provide a simple neuromorphic hardware implementation. For example, same and simple dendritic and axonal kernels may be implementable as look-up tables (LUTs), oscillators, or capacitors, and can be shared by multiple neurons. The coding may be adapted (based on e.g., hardware limitations, tasks requirements, required precision, etc.) through LUT reprogramming without changes in the neuron design. For example, longer kernels may provide higher precision. Kernels may be provided with different energy/latency tradeoffs: linear, exponential, etc. The kernels may be robust to jittered temporal positions of spikes, e.g., staircase shaped.

According to some embodiments, the input unit may be configured to decode the one or more input signals using an input function (or dendritic kernel). The output unit may be configured to encode and emit one or more output signals using an output function (or axonal kernel).

According to some embodiments, the output function of the sending apparatus and the input function of the receiving apparatus may be different or same functions. This may, for example, enable that the axonal kernel of the sending apparatus corresponds to the dendritic kernel of the receiving apparatus, so that they can accurately communicate the value.

According to some embodiments, the internal neuron dynamics unit may comprise an accumulation block and an output generation block. The internal neuron dynamics unit may have a current state variable corresponding to previously received one or more signals. The output generation block may be configured to use an activation function for generating a current output value based on the current state variable. The accumulation block may be configured to repeatedly:

compute an adjustment of the current state variable using the current output value and a correction function indicative of a decay behavior of a time constant of the internal neuron dynamics unit, receive a current signal, update the current state variable using the computed adjustment and the received signal, the updated state variable becoming the current state variable, and cause the output generation block to generate a current output value based on the current state variable.

This embodiment may provide a desirable implementation of the model of the internal neuron dynamics.

According to some embodiments, the accumulation block may be configured to perform the updating using an activation function different from the activation function of the output generation block.

According to some embodiments, the accumulation block may be configured to receive from the output generation block a reset signal indicative of the current output value used for the computing of the adjustment.

According to some embodiments, the output generation block may be configured to automatically provide to the accumulation block a reset signal indicative of the current output value used for the computing of the adjustment upon generating the current output value.

According to some embodiments, the output generation block may be configured to provide a reset signal indicative of the current output value used for the computing of the adjustment via a reset gate connecting the accumulation block and the output generation block.

FIG. 1 illustrates an example of a neural apparatus 100 consistent with some embodiments of the disclosure. The neural apparatus 100 may be implemented using a neuromorphic hardware implementation. For example, the neural apparatus may be a circuit using memristors to implement at least part of the disclosure. The neural apparatus 100 may alternatively be implemented by e.g., using analog or digital CMOS circuits.

The neural apparatus 100 may comprise an input unit 102, internal neuron dynamics unit 103, and output unit 104. The neural apparatus 100 may receive and process incoming signals or values. The input unit 102 may be configured to process a set $S_{p_k}$ of one or more spikes that are present in a decode time period $p_k$. The set of spikes $S_{p_k}$ may represent, for example, a temporally-coded value/signal $V_{p_k}$. For example, each spike $r_i$ of the set $S_k$ of spikes may pass through a synapse unit 105, of the input unit 102, with a synaptic weight $w_i$ and weighted as follows: $w_i \times r_i$, which may be the result of multiplication of $r_i$ by $w_i$. The synapse unit 105 may further be configured to provide a weight unit 106 with the weighted value $w_i \times r_i$ of the spike $r_i$. In a spiking neural network, $r_i$ may have values 0 or 1. The weight unit 106 may select for each weighted value $w_i \times r_i$ a modulating value $\alpha_i$ that corresponds to the arrival time of the spike $r_i$ and the weighted value $w_i \times r_i$ may be convolved with the selected modulating value e.g., as follows: $w_i \times r_i \times \alpha_i$. The weight unit 106 may further be configured to compute a somatic input $Z_{in,p_k}$. The somatic input $Z_{in,p_k}$ may be defined as the sum of the computed values $w_i \times r_i \times \alpha_i$ of each spike of the set of spikes $S_k$ in the decode time period $p_k$. The somatic input $Z_{in,p_k}$ may be the result of decoding the value $V_{p_k}$ and may thus be named decoded signal. The input unit 102 may be configured to provide the somatic input $Z_{in,p_k}$ to the internal neuron dynamics unit 103.

Upon termination of the decode time period $p_k$, the internal neuron dynamics unit 103 may process the somatic input $Z_{in,p_k}$ using a model $f$ in order to compute a somatic output $Z_{out,p_{k+1}} = f(Z_{in,p_k})$. In other words, neural dynamics model $f$ may use the somatic input $Z_{in,p_k}$ to calculate the somatic output $Z_{out,p_{k+1}}$. The model $f$ may, for example, be the rectified linear activation function, step function, or a combination thereof. Another example of the model $f$ is provided with reference to FIG. 2. The internal neuron dynamics unit 103 may be configured to provide the somatic output $Z_{out,p_{k+1}}$ to the output unit 104.

The output unit 104 may apply an axonal kernel on the somatic output $Z_{out, p_{k+1}}$ to generate a set $S_{p_{k+1}}$ of one or more output spikes that are emitted in a subsequent decode time period $p_{k+1}$. For example, if the somatic output $Z_{out,p_{k+1}}$ is higher than the maximum value of the axonal kernel, then multiple spikes may be emitted in the decode time period $p_{k+1}$ because multiple values may need to be combined in order to represent the somatic output $Z_{out,p_{k+1}}$. If the somatic output $Z_{out,p_{k+1}}$ is equal to zero, then no spikes may be emitted. If the somatic output $Z_{out,p_{k+1}}$ is within the range of values of the axonal kernel, one spike may be emitted in the decode time period $p_{k+1}$. The set of spikes $S_{p_{k+1}}$ may be input to another neural apparatus that is configured to process the set of spikes $S_{p_{k+1}}$ as described herein with the neural apparatus 100.

Figure 2:
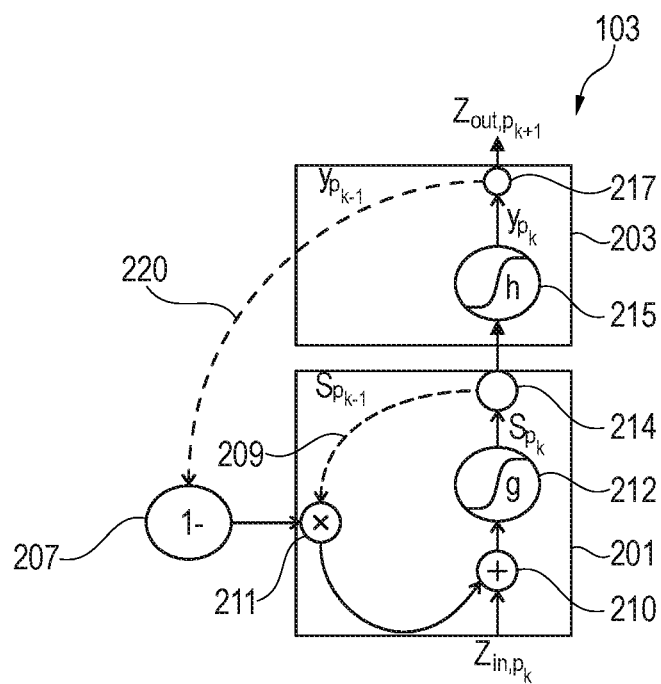
FIG. 2 illustrates an example implementation of an internal neuron dynamics unit consistent with some embodiments of the disclosure.

FIG. 2 illustrates another example implementation of the internal neuron dynamics unit 103 consistent with some embodiments of the disclosure. FIG. 2 shows the status of the internal neuron dynamics unit 103 after receiving a signal $Z_{in,p_k}$ for the decode time period $p_k$. In order to generate an output value $y_{p_k}$ consistent with some embodiments of the disclosure, the internal neuron dynamics unit 103 may involve a time dependent state variable $s_{p_k}$ (e.g., which may represent a membrane potential) that may be used to define the output value.

The internal neuron dynamics unit 103 may comprise an accumulation block 201 and an output generation block 203. The accumulation block 201 may comprise an adder circuit 210, a multiplication circuit 211, and an activation circuit 212. The multiplication circuit 211 may, for example, be a reset gate. The accumulation block 201 may be configured to output at the branching point 214, the computed state variable in parallel to the output generation block 203 and to the multiplication logic 211. The connection 209 between the branching point 214 and the multiplication logic 211 is shown as a dashed line to indicate that the connection 209 is with a time-lag. That is, at the time the an internal neuron dynamics unit 103 is processing a received somatic input $Z_{in,p_k}$ to generate corresponding $s_{p_k}$ and $y_{p_k}$, the connection 209 may transmit a value of a previous state variable $s_{p_{k-1}}$ of a previous decode time period $p_{k-1}$.

The output generation block 203 may comprise an activation logic 215. The output generation block 203 may be configured to receive a state variable from the accumulation block 201. Based on the received state variable, the output generation block 203 may generate and provide or output an output value at a branching point 217 in parallel to another neural apparatus, and to a reset module 207 of the internal neuron dynamics unit 103. The reset module 207 may be configured to generate a reset signal from the received output value and provide the reset signal to the multiplication logic 211. For example, for a given output value $y_{p_{k-1}}$, the reset module may generate a reset signal indicative of a value $1-y_{p_{k-1}}$. The connection 220 is shown as a dashed line to indicate that the connection 220 is with a time-lag. That is, at the time the internal neuron dynamics unit 103 is processing a received somatic input $Z_{in,p_k}$ to generate corresponding $s_{p_k}$ and $y_{p_k}$ in some embodiments, the connection 220 may transmit a previous output value $y_{p_{k-1}}$. The connections 209 and 220 may enable a feedback capability within the internal neuron dynamics unit 103. In particular, the connection 209 may be a self-looping connection within the accumulation block and the connection 220 may activate a gating connection for performing the state reset.

Upon receiving the state variable value $s_{p_{k-1}}$ and the output value $y_{p_{k-1}}$, the multiplication logic 211 may be configured to compute an adjustment as follows: $l(\tau) \odot s_{p_{k-1}} \odot (1-y_{p_{k-1}})$, where $l(\tau)$ is a correction function that takes into account the decay behavior of the state variable with the time constant $\tau$. The values of $l(\tau)$ may, for example, be stored in a memory of the neural apparatus. For example, the correction function may be defined as follows $$l(\tau) = \left(1 - \frac{\Delta T}{\tau}\right),$$

where $\Delta T$ is an internal neuron dynamics unit sampling time. The adjustment computed by the multiplication circuit 211 may be output and fed to the adder circuit 210. The adder circuit 210 may be configured to receive the adjustment from the multiplication circuit 211 and the somatic input $Z_{in,p_k}$. The adder circuit 210 may further be configured to perform the sum of the received adjustment and the somatic input $Z_{in,p_k}$ as follows: $Z_{in,p_k} + l(\tau) \odot s_{p_{k-1}} \odot (1-y_{p_{k-1}})$. This sum may be provided or output by the adder circuit 210 to the activation circuit 212. The activation circuit 212 may be configured to receive the computed sum from the adder circuit 210. The activation circuit 212 may be configured to apply its activation function on the computed sum in order to compute the state variable $s_{p_k}$ as follows: $s_{p_k} = g(Z_{in,p_k} + l(\tau) \odot s_{p_{k-1}} \odot (1-y_{p_{k-1}}))$. The resulting state variable $s_{p_k}$ may be output in parallel to the activation circuit 215 of the output generation block 203 and to the multiplication circuit 211 (the outputting to the multiplication circuit 211 may be useful for a next received somatic input $Z_{in,p_{k+1}}$). The activation circuit 215 may be configured to receive the state variable $s_{p_k}$ and to generate from the state variable $s_{p_k}$ an output value $y_{p_k}$. For example, $y_{p_k} = f(Z_{in,p_k}) = h(s_{p_k})$, where h is an activation function such as a sigmoid activation function. As the internal neuron dynamics unit 103 may be biased because it may have an additional input with constant value b, the constant value b (bias value) may be taken into account. For example, the bias value b may be used for determining the output value y(t) as follows $y_{p_k} = f(Z_{in,p_k}) = h(s_{p_k} + b)$. This may enable an improved performance of the internal neuron dynamics unit 103. The generated output value $y_{p_k}$ may be output to the reset module 207 for usage for a next received somatic input. And, the output value $y_{p_k}$ may be provided as the somatic output $Z_{out,p_{k+1}} = Y_{p_k}$.

Figure 3:
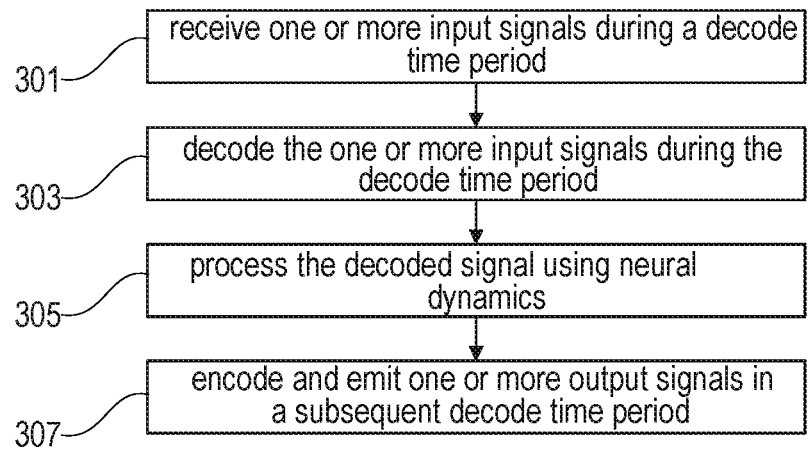
FIG. 3 is a flowchart of a method for processing input signals by a neural apparatus consistent with some embodiments of the disclosure.

FIG. 3 is a flowchart of a method for processing input signals by a neural apparatus e.g., 100 consistent with some embodiments of the disclosure. For simplification of the description, FIG. 3 will be described with reference to the simplified example of FIG. 4, but this disclosure is not limited to that example.

Figure 4:
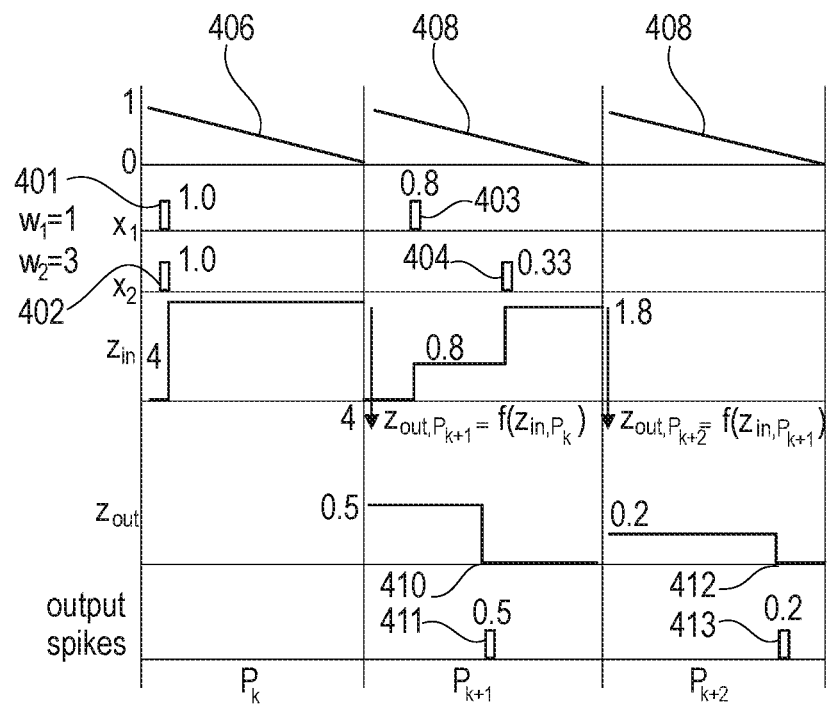
FIG. 4 illustrates an example time dependent function for determining modulating values consistent with some embodiments of the disclosure.

The neural apparatus may receive (at operation 301) an input signal $V_{p_k}$ during a decode time period $p_k$. The input signal $V_{p_k}$ may be a temporal-coded value. The received input signal $V_{p_k}$ may be represented by a set of spikes $S_{p_k}$. Following the example of FIG. 4, the received input signal $V_{p_k}$ may be represented by the spikes 401 and 402. FIG. 4 shows another received input signal $V_{p_{k+1}}$ during the decode time period $p_{k+1}$. The input signal $V_{p_{k+1}}$ may be represented by the spikes 403 and 404.

The neural apparatus may decode (at operation 303) the input signal $V_{p_k}$ during the decode time period $p_k$, resulting in a decoded signal $Z_{in,p_k}$. The decoding of the input signal $V_{p_k}$ may be performed as follows. When the set of spikes $S_{p_k}$ arrives at the synapses of the neural apparatus, the spikes may be weighted with the respective synaptic weights and the resulting values may be convolved with the respective kernel values, thereby the decoded signal $Z_{in,p_k}$ may be obtained for a particular neuron in a particular period $p_k$. Following the example of FIG. 4, the spikes 401 and 402 may be weighted by the synaptic weights W1 and W2 respectively. The weighted values may then be convolved with the respective kernel values of the kernel function 406. The kernel values may be the values of the kernel function 406 at the time positions of the two spikes in the decode time period $p_k$. The kernel function 406 may be a linear kernel. The resulting values may be summed to obtain the value of the decoded signal $Z_{in,p_k}$ which is four in this example. Similarly, the spikes 403 and 404 may be weighted by the synaptic weights W1 and W2 respectively. The weighted values may then be convolved by the respective kernel values of the kernel function 406. The kernel values may be the values of the kernel function 406 at the time positions of the two spikes 403 and 404 in the decode time period $p_{k+1}$. The resulting values may be summed to obtain the value of the decoded signal $Z_{in,p_{k+1}}$ which is 1.8 in this example.

Upon termination of the decode time period $p_k$, the neural apparatus may process (at operation 305) the decoded signal $Z_{in,p_k}$ using a model $f$ of the internal neural dynamics to obtain a processed signal $Z_{out,p_{k+1}}$ as follows: $Z_{out,p_{k+1}} = f(Z_{in,p_k})$. Following the example of FIG. 4, the processed signal $Z_{out,p_{k+1}}$ of the received signal $V_{p_k}$ is 0.5 and the processed signal $Z_{out,p_{k+2}}$ of the received signal $V_{p_{k+1}}$ is 0.2.

The processed signal $Z_{out,p_{k+1}}$ may be used (at operation 307) to encode and emit one or more output signals in a subsequent decode time period $p_{k+1}$ to another neural apparatus of the neural network system. This may, for example, be performed by using another kernel function 408. The point of time associated with the value of the kernel function 408 that is equal to the processed signal $Z_{out,p_{k+1}}$ may be the time at which a spike may be emitted. Following the example of FIG. 4, the processed signal $Z_{out,p_{k+1}}=0.5$ may be used to identify the point of time 410 that corresponds to the value 0.5 in the kernel function 408. The spike 411 may thus be emitted at that point of time 410. Similarly, the processed signal $Z_{out,p_{k+2}}=0.2$ may be used to identify the point of time 412 that corresponds to the value 0.2 in the kernel function 408. The spike 413 may thus be emitted at that point of time 412.

Figure 5A:
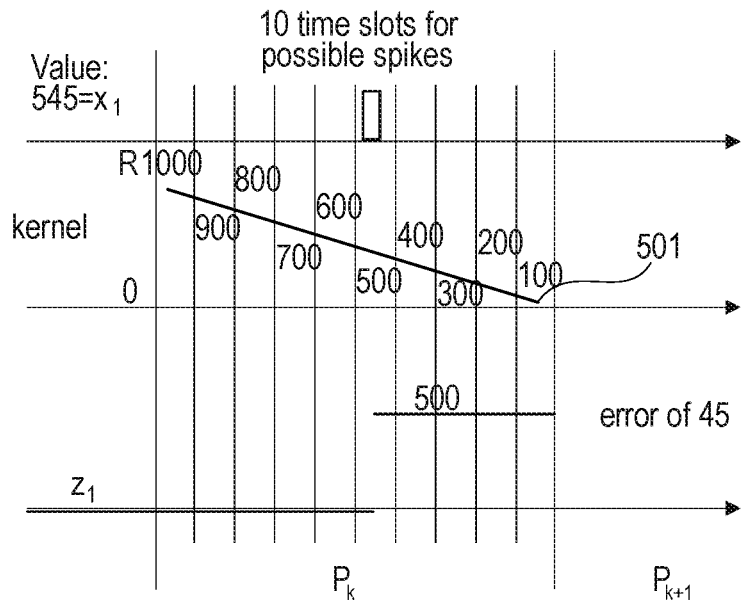
FIG. 5A illustrates an example time dependent function for determining modulating values consistent with some embodiments of the disclosure.

FIG. 5A illustrates an example time dependent function (also named kernel function) for determining modulating values consistent with some embodiments of the present disclosure.

Figure 5B:
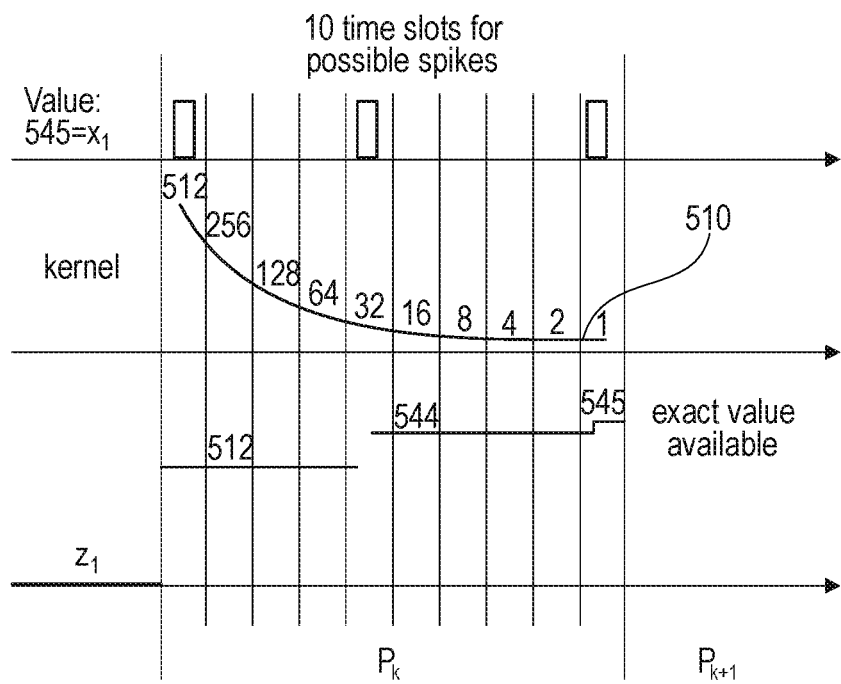
FIG. 5B illustrates an example time dependent function for determining modulating values consistent with some embodiments of the disclosure.

The time dependent function 501 may be a linear function that has a maximum value of 1000 and a minimum value of 100 in the decode time period $p_k$. The linear function may provide a simplified implementation and reliable results. As shown in Figure 5A, ten values of the function 501 may be provided. The ten values may be associated with respective ten time slots. For example, for a received value of 545, the time slot number 6 may be identified as the time that corresponds (closest one) to the value 545. One spike may thus be emitted in that time slot number six. However, that time slot may be associated with a value 500 that may provide an error of 45 on the real value of the input signal. To improve this, the time dependent function 510 of FIG. 5B may be used. The time dependent function 510 may be an exponential kernel that has a maximum value of 512 and a minimum value of one in the decode time period $p_k$. The exponential kernel may be in the form $R/2^{\Delta t+1}$ where R is a range of 1024. As shown in FIG. 5B, ten values of the function 510 may be provided. The ten values may be associated with respective ten time slots. For the same received value of 545, the time slot numbers one, five, and ten may be identified as the times that correspond to the value 545 because the sum of the values (512+32+1) of the kernel function 510 in the time slots one, five, and ten is equal to the received value 545. In this case, three spikes may thus be emitted in that time slots numbers one, five, and ten.

Figure 6:
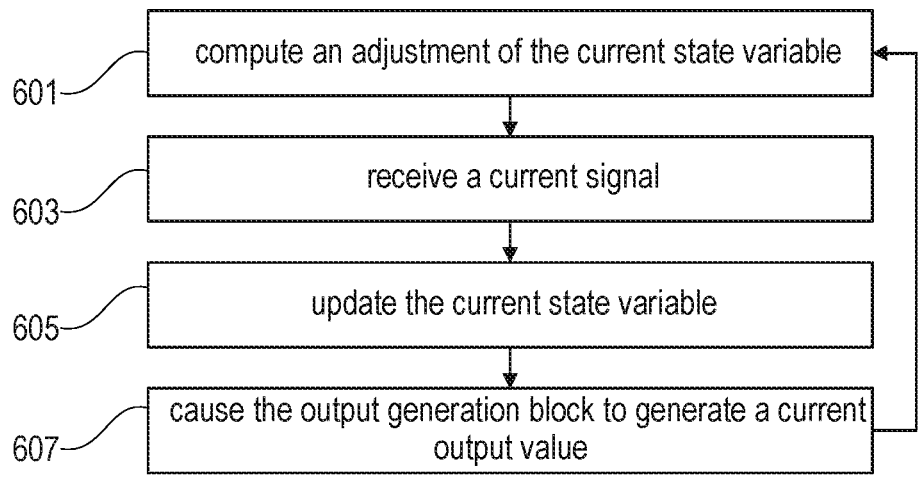
FIG. 6 is a flowchart of a method for generating an output value by an internal neuron dynamics unit consistent with some embodiments of the disclosure.

FIG. 6 is a flowchart of a method for generating an output value $Z_{out,p_{k+1}}=y_{p_k}$ by the internal neuron dynamics unit 103 comprising the accumulation block 201 and the output generation block 203 consistent with some embodiments of the present disclosure. The internal neuron dynamics unit 103 may have a state variable $s_{p_0}$ and output value $y_{p_0}$ that may be initialized to respective predefined values (e.g., $s_{p_0}=0$ and $y_{p_0}=0$). For example, before receiving and processing any signals, the internal neuron dynamics unit 103 may have an initial configuration that has initial values $s_{p_0}$ and output value $y_{p_0}$.

At operation 601, the accumulation block 201 may compute an adjustment of the current state variable $s_{p_0}$ using the current output value $y_{p_0}$ and a correction function indicative of a decay behavior of a time constant of the internal neuron dynamics unit 103. For example, the adjustment may be computed as follows: $l(\tau) \odot s_{p_0} \odot (1-y_{p_0})$.

After computing the adjustment, the accumulation block 201 may receive, in operation 603, a current signal $Z_{in,p_1}$. In another example, the signal $Z_{in,p_1}$ may be received before or in parallel to the computation operation 601.

In operation 605, the current state variable $s_{p_0}$ may be updated by the accumulation block 201 using the computed adjustment and the received signal $Z_{in,p_1}$. For example, the updated value $s_{p_1}$ may be obtained as follows: $s_{p_1}=g(Z_{in,p_1}+l(\tau) \odot s_{p_0} \odot (1-y_{p_0}))$. And, $s_{p_1}$ becomes, thus, the current state variable.

In operation 607, the accumulation block 201 may cause the output generation block 203 to generate a current output value $y_{p_1}$ based on the current state variable $s_{p_1}$.

Operations 601-607 may be repeated for each received subsequent signal $Z_{in,p_2}$. For example, in a first iteration used for processing a subsequent signal $Z_{in,p_2}$, the values $s_{p_1}$ and $y_{p_1}$ may be the current values of the state variable and the output. In a second iteration used for processing a subsequent signal $Z_{in,p_3}$, the values $s_{p_2}$ and $y_{p_2}$ may be the current values of the state variable and the output and so on.

Figure 7:
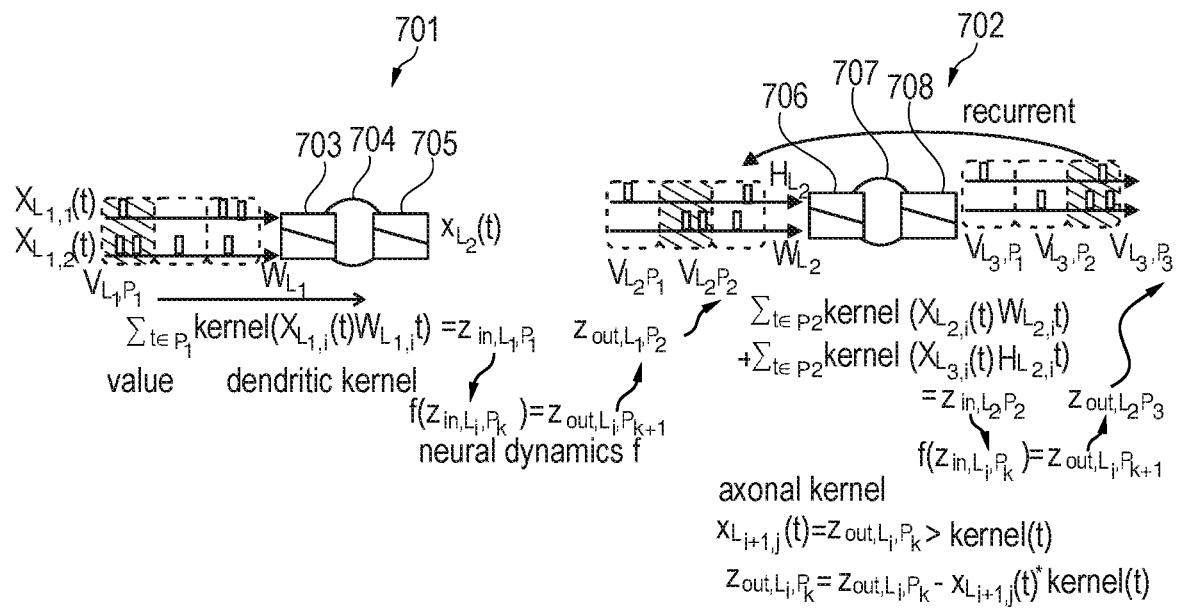
FIG. 7 is a diagram illustrating a method for decoding and encoding signals using two neural apparatuses consistent with some embodiments of the disclosure.

FIG. 7 is a diagram illustrating a method for decoding and encoding signals using two neural apparatuses 701 and 702 consistent with some embodiments of the disclosure. The neural apparatus 701 may be named sending apparatus and neural apparatus 702 may be named receiving apparatus. The neural apparatus 701 may receive a temporally coded value $V_{L1,p_1}$. The value $V_{L1,p_1}$ may be represented by input spikes $X_{L1,1}(t)$ and $X_{L1,2}(t)$ in the decode time period $p_1$. The input unit 703 of the neural apparatus 701 may decode the input spikes as follows: $\Sigma_{t\in p_1, k\in\{1,2\}} \text{kernel}_{in}(X_{L1,k}(t)W_{L1,k})t)=Z_{in,L1,p_1}$. $W_{L1,k}$ may be synaptic weights. $\text{kernel}_{in}$ may be the input kernel, dendritic kernel of the input unit 703. The decoded signal (or somatic input) $Z_{in,L1,p_1}$ may be processed by the internal neuron dynamics unit 704 of the neural apparatus 701 using the neural dynamics model $f$ in order to obtain the somatic output $Z_{out,L1,p_2}$. For example, the neural dynamics model $f$ may use the somatic input $Z_{in,L1,p_1}$ to compute the somatic output $Z_{out,L1,p_2}$ as follows: $Z_{out,L1,p_2}=f(Z_{in,L1,p_1})$. The somatic output $Z_{out,L1,p_2}$ may be used by the output unit 705 of the neural apparatus 701 in order to generate output spikes $X_{L2}(t)$. For that, the output unit 705 may apply an axonal kernel $\text{kernel}_{out}$ to determine the output signal by evaluating for each consecutive timestep t: $X_{L2}(t)=Z_{out,L1,p_2} > \text{kernel}_{out}(t)$, and updating the somatic output: $Z_{out,L1,p_2} := Z_{out,L1,p_2}-X_{L2}(t)*\text{kernel}_{out}(t)$.

The output spikes $X_{L2}(t)$ that are in the decode time period $p_2$ may be received at the other neural apparatus 702. As with the neural apparatus 701, the input spikes $X_{L2}(t)$ received from the neural apparatus 701 e.g., along with input spikes $X_{L2,k}(t)$ from any neural apparatus connected in a feed-forward manner and input spikes $X_{L3,i}(t)$ from any neural apparatus connected in a recurrent manner, may be decoded by the input unit 706 of the neural apparatus 702 as follows: $\Sigma_{t\in p_2,k} \text{kernel}_{in}(X_{L2,k}(t)W_{L2,k})t) + = Z_{in,L1,p_1} + \Sigma_{t\in p_2,i} \text{kernel}_{in}(X_{L3,i}(t)W_{L2,i},t)=Z_{in,L2,p_2}$.

The difference with the decoded signal of the neural apparatus 701 in some embodiments is that a recurrent connection may be used in the neural apparatus 702. $H_{L2,i}$ may be recurrent weights. The somatic input $Z_{in,L2,p_2}$ may be processed by the internal neuron dynamics unit 707 of the neural apparatus 702 using the neural dynamics $f$ in order to, the somatic output $Z_{out,L2,p_3}$. For example, the neural dynamics $f$ may use the somatic input $Z_{in,L2,p_2}$ to compute the somatic output $Z_{out,L2,p_3}$ as follows: $Z_{out,L2,p_3}=f(Z_{in,L2,p_2})$. The somatic output $Z_{out,L2,p_3}$ may be used by the output unit 708 of the neural apparatus 702 in order generate output spikes $X_{L3}(t)$. For that, the output unit 708 may apply an axonal kernel $\text{kernel}_{out}$ to determine the output signal by evaluating for each consecutive timestep t: $X_{L3}(t)=Z_{out,L2,p_3} > \text{kernel}_{out}(t)$, and updating the somatic output: $Z_{out,L2,p_3} := Z_{out,L2,p_3}-X_{L3}(t)*\text{kernel}_{out}(t)$.

Figure 8A:
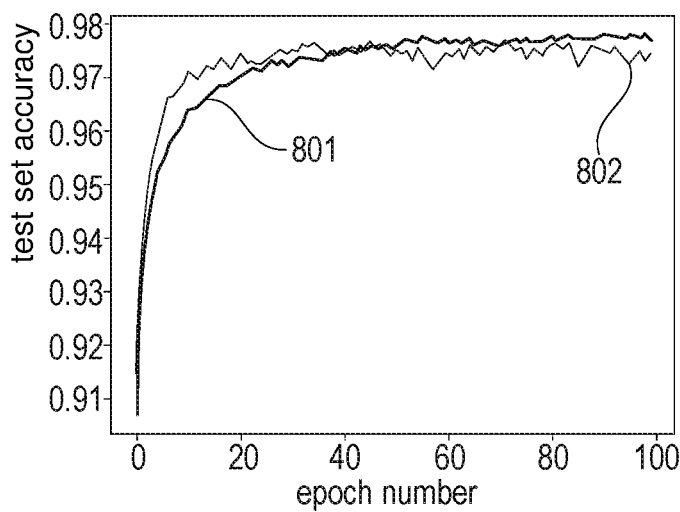
FIG. 8A is a plot showing the test accuracy of an example SNN consistent with some embodiments of the disclosure.
Figure 8B:
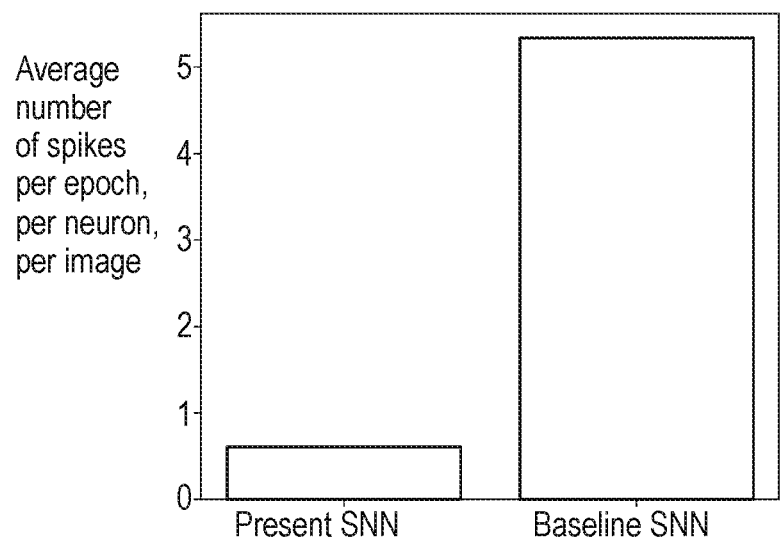
FIG. 8B is a plot showing the average number of spikes produced by an example SNN consistent with some embodiments of the disclosure.

FIGS. 8A and 8B are plots showing the test accuracy and number of spikes of an example SNN consistent with some embodiments of the disclosure. The SNN in this embodiment may comprise neurons, wherein each neuron may be the neural apparatus according to some embodiments of the disclosure. Each of the neurons may use piecewise linear kernels as the input and output functions. The SNN may have three layers consistent with some embodiments of the disclosure, respectively. A baseline SNN is used for comparison purpose. The baseline SNN receives inputs encoded using the common rate coding approach. A dataset of MNIST images is used to perform the test. As shown in FIG. 8A, the SNN consistent with some embodiments may provide an accuracy of 97.8% (as indicated by curve 801) higher than an accuracy of 97.68% of the baseline SNN (as indicated by curve 802). Also, the average number of spikes per epoch, per neuron, and per image of the SNN consistent with some embodiments may be significantly smaller than that number in the baseline SNN. This may enable higher code efficiency and less spikes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

The present disclosure may be a system, a method, and/or a computer program product. The computer program product may include a computer readable storage medium (or media) having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device may receive computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, may implement the functions/acts/operations specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act/operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions that execute on the computer, other programmable apparatus, or other device implement the functions/acts/operations specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A neuron of an artificial neural network system, the neuron being configured to:
  receive, at an input unit of the neuron, one or more input signals during a decode time period;
  decode, at the input unit, the one or more input signals during the decode time period, resulting in a decoded signal;
  upon termination of the decode time period, process, at an internal neuron dynamics unit of the neuron, the decoded signal using a model indicative of internal neural dynamics, wherein the internal neuron dynamics unit operates at a first exponential kernel timescale; and
  use the processed signal to encode and emit, at an output unit of the neuron, one or more output signals in a subsequent decode time period to another neuron of the artificial neural network system, wherein the output unit operates at a second exponential kernel timescale that is different from the first exponential kernel timescale.

2. The neuron of claim 1, wherein each of the input and output signals encodes information in an arrival time of a signal at a respective neuron, and wherein a same signal can encode different information depending on its arrival time.

3. The neuron of claim 1, wherein the neuron is configured to decode the input signals by:
  a) upon receiving the one or more input signals, determining for the input signal a modulating value corresponding to an arrival time of the input signal;
  b) weighting the received signal with the determined modulating value to produce a weighted signal;
  c) integrating the weighted signal into a current value of an input state of the neuron to create an integrated value; and
  d) repeating operations a) to c) for each received input signal during the decode time period, wherein the decoded signal is the integrated value.

4. The neuron of claim 3, wherein the neuron is configured for determining the modulating value as a value of an input function at the arrival time; and wherein the input function is a time dependent piecewise linear function.

5. The neuron of claim 4, wherein the input function comprises values decreasing with increasing values of the arrival time.

6. The neuron of claim 3, wherein the neuron is configured for determining the modulating value as a value of an input function at the arrival time, wherein the input function is a time dependent non-linear function involving a predefined range of values.

7. The neuron of claim 1, wherein:
  the neuron is configured to encode and emit the one or more output signals using an output function, the output function being configured to provide a value for each point of time in the subsequent decode time period; and
  the neuron is configured to determine one or more values of the output function such that a combination of the determined values represents a value of the processed signal, and providing the one or more output signals at the points of time corresponding to the determined values.

8. The neuron of claim 1, wherein the input unit is configured to decode the one or more input signals using an input function, and wherein the output unit is configured to encode and emit one or more output signals using an output function.

9. The neuron of claim 1, wherein:
  the internal neuron dynamics unit comprises an accumulation block and an output generation block, the internal neuron dynamics unit having a current state variable corresponding to previously received one or more signals, the output generation block being configured to use an activation function for generating a current output value based on the current state variable; and
  the accumulation block is configured to repeatedly:
    compute an adjustment of the current state variable using the current output value and a correction function indicative of a decay behavior of a time constant of the internal neuron dynamics unit;
    receive a current signal;
    update the current state variable using the computed adjustment and the received signal, the updated state variable becoming the current state variable; and
    cause the output generation block to generate the current output value based on the current state variable.

10. The neuron of claim 9, wherein the accumulation block is configured to perform the updating using an activation function different from the activation function of the output generation block.

11. The neuron of claim 9, wherein the accumulation block is configured to receive from the output generation block a reset signal indicative of the current output value used for the computing of the adjustment.

12. The neuron of claim 9, wherein the output generation block is configured to automatically provide to the accumulation block a reset signal indicative of the current output value used for the computing of the adjustment upon generating the current output value.

13. The neuron of claim 9, wherein the output generation block is configured to provide a reset signal indicative of the current output value used for the computing of the adjustment via a reset gate connecting the accumulation block and the output generation block.

14. A method for a neuron of an artificial neural network, comprising:
  receiving, at an input unit of the neuron, one or more input signals during a decode time period;
  decoding, at the input unit, the one or more input signals during the decode time period, resulting in a decoded signal;
  upon termination of the decode time period, processing, at an internal neuron dynamics unit of the neuron, the decoded signal using a model indicative of internal neuron dynamics, wherein the internal neuron dynamics unit operates at a first exponential kernel timescale; and using the processed signal to encode and emit, at an output unit of the neuron, one or more output signals in a subsequent decode time period to another neuron of the artificial neural network, wherein the output unit operates at a second exponential kernel timescale that is different from the first exponential kernel timescale.

15. A computer program product comprising a computer-readable storage medium having program instructions embodied therewith, the program instructions executable by a computer to cause the computer to:

receive, at an input unit of a neuron of an artificial neural network, one or more input signals during a decode time period;

decode, at the input unit, the one or more input signals during the decode time period, resulting in a decoded signal;

upon termination of the decode time period, process, at an internal neuron dynamics unit of the neuron, the decoded signal using a model indicative of internal neuron dynamics, wherein the internal neuron dynamics unit operates at a first exponential kernel timescale; and use the processed signal to encode and emit, at an output unit of the neuron, one or more output signals in a subsequent decode time period to another neuron of the artificial neural network, wherein the output unit operates at a second exponential kernel timescale that is different from the first exponential kernel timescale.

* * * * *